(12) United States Patent
Shintani et al.

(10) Patent No.: US 8,544,111 B2
(45) Date of Patent: Sep. 24, 2013

(54) ACTIVATING LICENSABLE COMPONENT PROVIDED BY THIRD PARTY TO AUDIO VIDEO DEVICE

(75) Inventors: Peter Shintani, San Diego, CA (US); Ludovic Etienne Douillet, Escondido, CA (US)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 13/034,179

(22) Filed: Feb. 24, 2011

(65) Prior Publication Data

US 2012/0124678 A1  May 17, 2012

Related U.S. Application Data

(63) Continuation of application No. 12/970,215, filed on Dec. 16, 2010.

(60) Provisional application No. 61/412,552, filed on Nov. 11, 2010.

(51) Int. Cl.
*G06F 21/00* (2013.01)

(52) U.S. Cl.
USPC .............................. 726/29; 725/45; 713/168

(58) Field of Classification Search
USPC ........................................ 726/29; 715/748
See application file for complete search history.

(56) References Cited

U.S. PATENT DOCUMENTS

| | | |
|---|---|---|
| 5,894,516 A | 4/1999 | Brandenburg |
| 6,047,128 A | 4/2000 | Zander |
| 6,199,044 B1 | 3/2001 | Ackley et al. |
| 6,658,663 B1 | 12/2003 | Bruynsteen |
| 6,827,260 B2 | 12/2004 | Stoutenburg et al. |
| 7,222,206 B2 | 5/2007 | Kee et al. |
| 7,350,707 B2 | 4/2008 | Barkan et al. |
| 7,487,129 B2 | 2/2009 | Doll-Steinberg |
| 7,508,459 B2 | 3/2009 | Mayer et al. |
| 7,678,984 B1 | 3/2010 | Lamere |
| 7,747,533 B2 | 6/2010 | Zhang et al. |
| 7,890,430 B2 | 2/2011 | Lopatic |
| 7,896,043 B2 | 3/2011 | Kashiwai |
| 8,217,753 B2 | 7/2012 | Harris |
| 8,266,710 B2 | 9/2012 | Al-Azzawi |
| 2001/0034846 A1 | 10/2001 | Beery |
| 2002/0002706 A1 | 1/2002 | Sprunk |
| 2002/0049717 A1 | 4/2002 | Routtenberg et al. |
| 2003/0066080 A1 | 4/2003 | Kamienieki |
| 2003/0097571 A1 | 5/2003 | Hamilton et al. |
| 2003/0158807 A1* | 8/2003 | Takeshi .......................... 705/37 |
| 2003/0191650 A1 | 10/2003 | Turner et al. |
| 2004/0068740 A1* | 4/2004 | Fukuda et al. ................. 725/45 |
| 2004/0098752 A1 | 5/2004 | Bruynsteen |

(Continued)

OTHER PUBLICATIONS

Alspaugh, "Intellectual Property Rights Requirements for Heterogeneously-Licensed Systems" 2009, IEEE, pp. 24-33.*

(Continued)

*Primary Examiner* — Morshed Mehedi
*Assistant Examiner* — Gregory Lane
(74) *Attorney, Agent, or Firm* — John L. Rogitz

(57) ABSTRACT

An audio-video display device can download from a third party server a licensable component on which a royalty is to be paid. Various methods are disclosed for accounting for royalties associated with downloading the licensable component to the client device between the third party server and a client device manufacturer server.

19 Claims, 8 Drawing Sheets

(56) References Cited

U.S. PATENT DOCUMENTS

| | | |
|---|---|---|
| 2005/0039025 A1 | 2/2005 | Main et al. |
| 2005/0138387 A1 | 6/2005 | Lam et al. |
| 2005/0154795 A1 | 7/2005 | Kuz et al. |
| 2006/0022034 A1 | 2/2006 | Barkar et al. |
| 2006/0059571 A1 | 3/2006 | Chen et al. |
| 2006/0088010 A1 | 4/2006 | Buchwald et al. |
| 2006/0106726 A1 | 5/2006 | Raley et al. |
| 2006/0111920 A1 | 5/2006 | Jacobs et al. |
| 2006/0131397 A1 | 6/2006 | Reddy et al. |
| 2006/0146200 A1 | 7/2006 | Edde et al. |
| 2006/0190052 A1 | 8/2006 | Yun et al. |
| 2007/0027815 A1 | 2/2007 | Sobel et al. |
| 2007/0174919 A1 | 7/2007 | Raines et al. |
| 2008/0005680 A1* | 1/2008 | Greenlee ............... 715/748 |
| 2008/0083040 A1 | 4/2008 | Dani et al. |
| 2008/0134237 A1 | 6/2008 | Tu et al. |
| 2008/0250443 A1 | 10/2008 | Fan et al. |
| 2008/0313086 A1 | 12/2008 | Milgramm |
| 2009/0006225 A1 | 1/2009 | Multerer et al. |
| 2009/0019501 A1 | 1/2009 | Saxena et al. |
| 2009/0106038 A1 | 4/2009 | Sawaki et al. |
| 2009/0183000 A1* | 7/2009 | Krig ............... 713/168 |
| 2009/0212909 A1 | 8/2009 | Burger et al. |
| 2009/0293560 A1 | 12/2009 | Ikeguchi |
| 2009/0319410 A1 | 12/2009 | Knight et al. |
| 2009/0320073 A1 | 12/2009 | Reisman |
| 2010/0026912 A1 | 2/2010 | Ho |
| 2010/0144336 A1* | 6/2010 | Kuk et al. ............... 455/418 |
| 2010/0156592 A1 | 6/2010 | Lewis |
| 2010/0164681 A1 | 7/2010 | Harris |
| 2010/0185868 A1 | 7/2010 | Grecia |
| 2010/0192180 A1 | 7/2010 | Olague et al. |
| 2010/0218181 A1 | 8/2010 | Seiden |
| 2010/0250400 A1 | 9/2010 | Fernandez Gutierrez |
| 2010/0302380 A1 | 12/2010 | Law et al. |
| 2011/0047540 A1* | 2/2011 | Williams et al. ............... 717/178 |
| 2011/0054923 A1 | 3/2011 | Miloslavsky et al. |
| 2011/0166968 A1 | 7/2011 | Houg et al. |
| 2011/0295843 A1 | 12/2011 | Ingrassia, Jr. et al. |
| 2011/0302623 A1 | 12/2011 | Ricci |
| 2012/0120250 A1 | 5/2012 | Shintnai et al. |

OTHER PUBLICATIONS

Peter Shintani, Aram Sadja, Theodore R. Booth, Ludovic Douillet, "Reducing TV Licensing Costs", related U.S. Appl. No. No. 12/970,215 non-final office action dated Jun. 18, 2012.

Peter Shintani, Aram Sadja, Theodore R. Booth, Ludovic Douillet, "Reducing TV Licensing Costs", related pending U.S. Appl. No. 12/970,215 applicants response filed Jun. 22, 2012 to the non-final office action dated Jun. 18, 2012.

Peter Shintani, Aran London Sadja, Ludovic Douillet; "Activating Licensable Component of Consumer Electronics Device at Point of Sale", Non-final office action dated Apr. 25, 2012 in related U.S. Appl. No. 13/049,021.

Peter Shintani, Aran London Sadja, Ludovic Douillet; "Activating Licensable Component of Consumer Electronics Device at Point of Sale", Applicants response to Non-final office action dated Apr. 25, 2012 in related U.S. Appl. No. 13/049,021, filed May 14, 2012.

Peter Shintani, Ludovic Etienne Douillet, Aran London Sadja, "Coordinating License Activation of Licensable Audio Video (AV) Device Components Between Contract Manufacturer and Brand Manufacturer", Non-final office action dated Jun. 1, 2012 in related U.S. Appl. No. 13/073,047.

Peter Shintani, Ludovic Etienne Douillet, Aran London Sadja, "Coordinating License Activation of Licensable Audio Video (AV) Device Components Between Contract Manufacturer and Brand Manufacturer", Applicants response to Non-final office action dated Jun. 1, 2012 in related U.S. Appl. No. 13/073,047, filed Jun. 11, 2012.

Amazon Web Service, "STR3Em—Digital Distribution System (Ultraviolet Keychest)", http://www.str3em.com, created on Jun. 22, 2009.

CNET, "Search results for str3em", http://download.cnet.com/1770-20_4-0.html?query=str3em&tag=404&searchtype=download, printed from internet May 22, 2012.

Peter Shintani. Aran Sadja, Ludovic Douillet, "Reducing TV Licensable Costs", related pending U.S. Appl. No. 12/970,215, filed Dec. 16, 2010.

Peter Shintani, Ludovic Douillet, "Activating Licensable Component Using Aggregating Device in Home Network" related pending U.S. Appl. No. 13/034,093, filed Feb. 24, 2011.

Peter Shintani, Aran Sadja, Ludovic Douillet, "Activating Licensable Component of Consumer Electronic Device at Point of Sale", related pending U.S. Appl. No. 13/049,021, filed Mar. 16, 2011.

Peter Shintani, Aran Sadja, Ludovic Douillet, "Activating Licensable Component of Consumer Electronic Device Post-Sale Using Software Package", related pending U.S. Appl. No. 13/072,941, filed Mar. 28, 2011.

Peter Shintani, Aran Sadja, Ludovic Douillet, "Tracking Details of Activation of Licensable Component of Consumer Electronic Device", related pending U.S. Appl. No. 13/072,978, filed Mar. 28, 2011.

Peter Shintani, "Tracking Activation of Licensable Component in Audio Video Device by Unique Product Identification", related pending U.S. Appl. No. 13/048,981, filed Mar. 16, 2011.

Peter Shintani, Stephane Lejeune, Robert Blanchard, Graham Clift, "Audio Video Device with Externally Bundled TV Turner", related pending U.S. Appl. No. 13/073,222, filed Mar. 28, 2011.

Peter Shintani, "Supplying Omitted Critical Code portion to Activate Licensable Component in Audio Video Device", related pending U.S. Appl. No. 13/045,835, filed Mar. 11, 2011.

Peter Shintani, Ludovic Douillet, Aran Sadja, "Coordinating License Activation of Licensable Audio Video (AV) Device Components Between Contract Manufacturer and Brand Manufacturer", related pending U.S. Appl. No. 13/073,047, filed Mar. 28, 2011.

Peter Shintani, Ludovic Douillet, Aran Sadja, "Activating Licensable Component of Consumer Electronics Device at Point of Sale", related U.S. Appl. No. 13/049,021 final office action dated Aug. 3, 2012.

Peter Shintani, Ludovic Douillet, Aran Sadja, "Activating Licensable Component of Consumer Electronics Device at Point of Sale", related U.S. Appl. No. 13/049,021 applicant response filed Sep. 18, 2012 to final office action.

Peter Shintani, Ludovic Douillet, Aran Sadja, "Coordinating License Activation of Licensable Audio Video (AV) Device Components between Contact Manufacturer and Brand Manufacturer", related U.S. Appl. No. 13/073,047 final office action dated Aug. 28, 2012.

Peter Shintani, Ludovic Douillet, Aran Sadja, "Coordinating License Activation of Licensable Audio Video (AV) Device Components between Contact Manufacturer and Brand Manufacturer", related application U.S. Appl. No. 13/073,047 applicants response filed Sep. 18, 2012 to final office action.

Peter Shintani, "Supplying Omitted Critical Code Portion to Activate Licensable Component in Audio Video Device", related U.S. Appl. No. 13/045,835, non-final office action dated Sep. 20, 2012.

Peter Shintani, "Supplying Omitted Critical Code Portion to Activate Licensable Component in Audio Video Device", related U.S. Appl. No. 13/045,835, applicants response filed Sep. 27, 2012 to non-final office action.

Peter Shintani, "Tracking Activation of Licensable Component in Audio Video Device by Unique Product Identification", related U.S. Appl. No. 13/048,981 Non-Final office action dated Jan. 4, 2013.

Peter Shintani, Stephane Lejeune, Robert Blanchard, Graham Clift, "Audio Video Device with Externally Bundled TV Tuner", related U.S. Appl. No. 13/073,222 Non-Final office action dated Dec. 21, 2012.

Peter Shintani, Aran London Sadja, Ludovic Etinne Douillet, "Tracking Details of Activation of Licensable Component of Consumer Electronic Device" related U.S. Appl. No. 13/072,978, final office action dated Apr. 18, 2013.

* cited by examiner

Setup Logic

Auto License Logic

Via Automated Phone Support

Licensing Logic

ACTIVATING LICENSABLE COMPONENT PROVIDED BY THIRD PARTY TO AUDIO VIDEO DEVICE

This application claims priority to U.S. patent application Ser. No. 12/970,215, filed Dec. 16, 2010 and to U.S. provisional patent application Ser. No. 61/412,552, filed Nov. 11, 2010.

I. FIELD OF THE INVENTION

The present application relates generally to activating a licensable component provided by a third party to an audio video device.

II. BACKGROUND OF THE INVENTION

Televisions incorporate a host of technologies to enable a viewer to watch programming from a variety of sources. These sources include terrestrial broadcast sources of analog (using National Television System Committee, or NTSC, format) and digital (using Advanced Television System Committee, or ATSC, format) TV signals. ATSC signals typically use video compression known as Motion Picture Experts Group (MPEG-2) and TVs must consequently support MPEG-2 decompression if they support ATSC programming.

Cable-provided "basic" television programming can also be provided in NTSC or quadrature amplitude modulation (QAM) format. Cable-provided "enhanced" programming may also be provided using high definition multimedia interface (HDMI) principles. Likewise, satellite-provided TV signals may be received in HDMI. As well, video from the Internet can be displayed on many modern TVs in a variety of formats, including data over cable service Internet specification (DOCSIS) format. Furthermore, TVs are often configured to support multiple audio formats, including advanced audio coding (AAC), Audio code 3 (AC3), digital theater system (DTS), and so on. And as contemporary viewers know, TVs are expected to support the presentation of electronic program guides (EPGs).

SUMMARY OF THE INVENTION

As understood herein, various TV technologies require license fees to be paid. As further understood herein, many technologies that must be built in to modern TVs to support various program sources may not be used. Nonetheless, license fees for the unused technologies are still paid, unnecessarily cascading cost. This can be complicated when a client device may receive a licensable feature from a third party transparently to the manufacturer of the client device.

Accordingly, a client device includes a processor, an input device communicating with the processor to indicate selection of a link to a third party server (TPS) providing a licensable component, and computer readable storage medium bearing instructions executable by the processor to, responsive to the signal and prior to accessing the licensable link pursuant to selection of the link, request permission from a client device manufacturer server (CDMS) affiliated with a manufacturer of the client device permission to download the licensable component from the TPS. The processor, responsive to a determination that permission to download the licensable component from the TPS is not granted, does not download the licensable component. On the other hand, responsive to a determination that permission to download the licensable component from the TPS is granted, the client device downloads from the TPS the licensable component.

The client device may receive information that the licensable component is available for download over a network from the TPS. The client device may delay access of the link by a browser executed by the processor pending grant of permission. In some embodiments the client device determines that permission is not granted to download the licensable component based on receiving an affirmative "not granted" reply from the CDMS. The client device may determine that permission is not granted to download the licensable component based on not receiving any reply from the CDMS before a timeout period expires. In contrast, the client device can determine that permission is granted to download the licensable component based on receiving an affirmative "granted" reply from the CDMS. Yet again, the client device can determine that permission is granted to download the licensable component based on not receiving any reply from the CDMS before a timeout period expires.

In another aspect, a client device includes a processor, an input device communicating with the processor to indicate selection of a link to a third party server (TPS) providing a licensable component, and computer readable storage medium bearing instructions executable by the processor to obtain the licensable component from the TPS, and responsive to obtaining the licensable component from the TPS, inform a client device manufacturer server (CDMS) affiliated with a manufacturer of the client device that the licensable component has been obtained from the TPS to facilitate accounting for royalties for the licensable component.

In some implementations the client device informs the CDMS that the client device has obtained the licensable component and has enabled the licensable component. In other embodiments the client device informs the CDMS that the client device has obtained the licensable component and requests permission from the CDMS to enable the licensable component. In this case, the client device can determine that permission is not granted to enable the licensable component based on receiving an affirmative "not granted" reply from the CDMS and responsive thereto does not enable the licensable component. Or, the client device may determine that permission is not granted to enable the licensable component based on not receiving any reply from the CDMS before a timeout period expires and responsive thereto does not enable the licensable component.

In example embodiments the client device can determine that permission is granted to enable the licensable component based on receiving an affirmative "granted" reply from the CDMS and responsive thereto enables the licensable component. Still again, the client device can determine that permission is granted to enable the licensable component based on not receiving any reply from the CDMS before a timeout period expires and responsive thereto can enable the licensable component.

In another aspect, a third party server (TPS) which is not affiliated with a manufacturer of a client device includes a processor and a computer readable storage medium bearing instructions executable by the processor to download to the client device the licensable feature and communicate with a client device manufacturer server (CDMS) affiliated with a manufacturer of the client device to inform the CDMS that the client device has obtained the licensable component such that royalty accounting therefor is facilitated.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
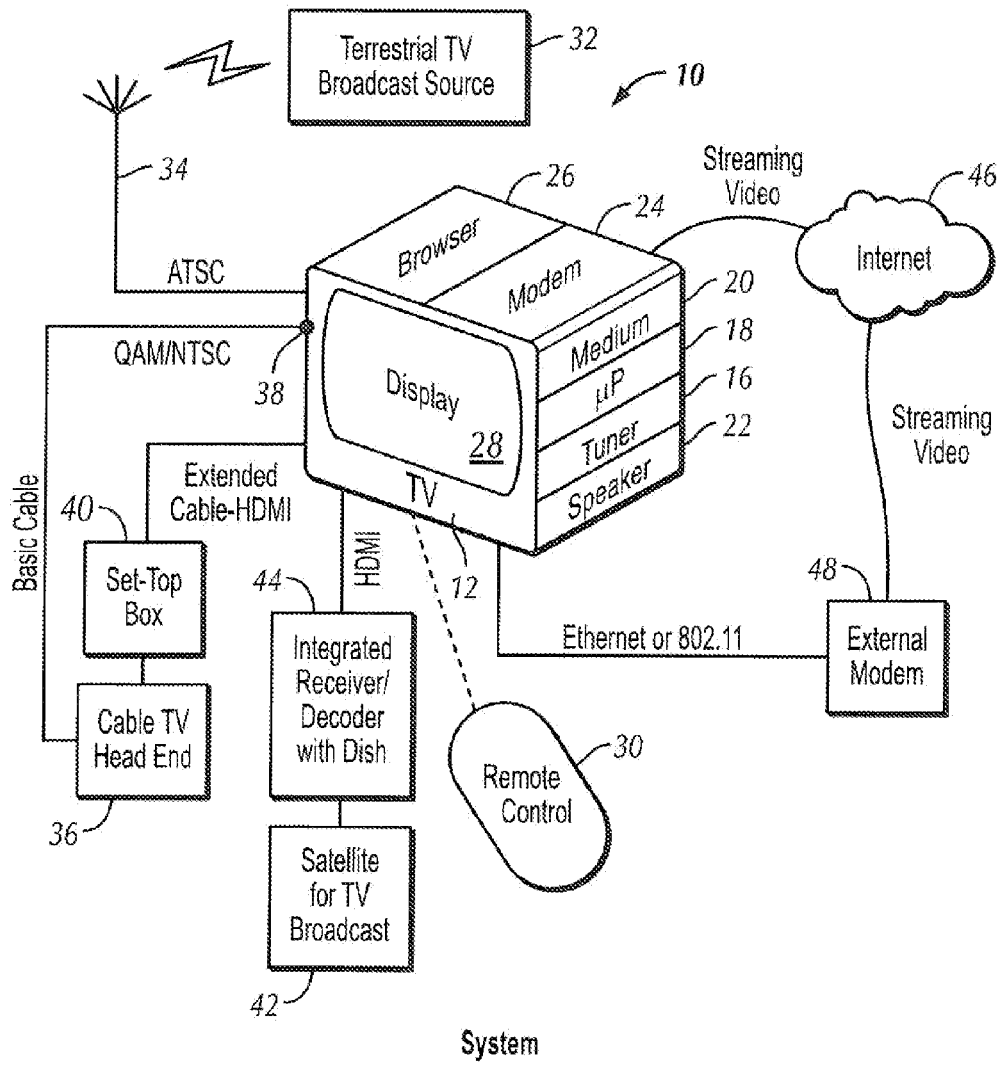
FIG. 1 is a block diagram of a non-limiting example system in accordance with present principles.

Referring initially to the non-limiting example embodiment show in FIG. 1, a system 10 includes an audio video device 12 such as a TV including a TV tuner, 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

Figure 2:
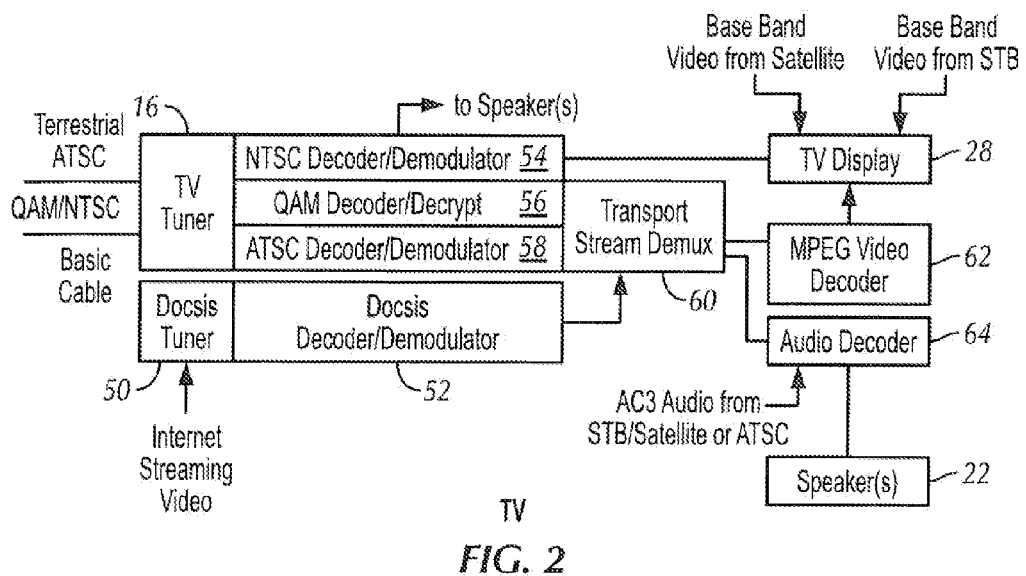
FIG. 2 is a block diagram of an example TV.

FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an NTSC decoder/demodulator 54, or a QAM decoder/demodulator 56, or an ATSC decoder/demodulator 58. The output from the NTSC decoder/demodulator 54 can be sent directly to the display 28 and speakers 22 for presentation. On the other hand, the output from the digital decoder/demodulators 56, 58 typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Figure 3:
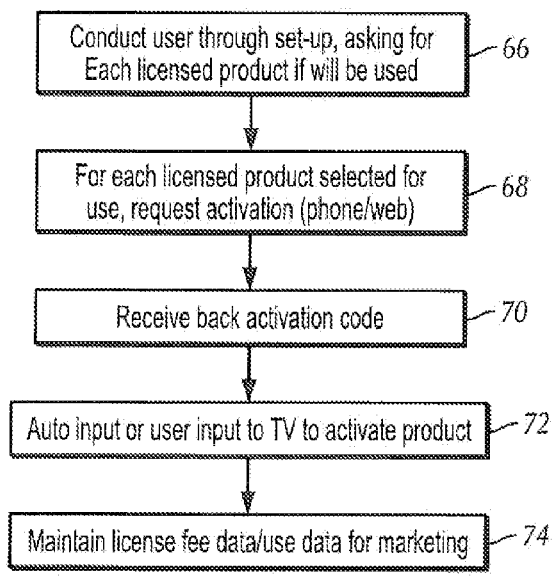
FIG. 3 is a flow chart of non-limiting TV set up logic in accordance with present principles.

Now referring to FIG. 3, at block 66 a user of the TV 12 can be conducted, using onscreen user interfaces (UI), through a set-up routine upon first power on or thereafter from a menu to set up various features of the TV. As an example, the user may be asked, for one or more licensable components within the TV, if the user desires to use that component. This may be done implicitly, e.g., by asking the user if the user wishes to automatically scan the broadcast spectrum to detect channels, in which case it may be inferred that the ATSC decoder/demodulator 58 and MPEG decoder 62 will be required and, hence, that licenses to use those components will be needed. Also, in this latter case it may be inferred that a license to the terrestrial broadcast EPG may be required, whereas such a license would not be required if terrestrial broadcast were not being used as an input source.

Or again, the user may be given the choice to receive Internet video through the built-in modem 24 or from an external modem 48 and if the latter is chosen, no license need be obtained for the internal browser 26; otherwise, a license may be required to use the internal browser 26.

Proceeding to block 68, for each license that is inferred to be required based on the user set-up selections at block 66, the TV 12 uploads a request for the license over the Internet, for example, or back through a two-way cable system, etc. Or, as explained further below the request may be made by telephone. Regardless of how made, the request typically identifies the component for which a license is required based on user input at block 66 along with a unique identification of the TV, e.g., a hash of the TV model number and serial number, in some embodiments encrypted if desired. Or, the unique identifier may be a high definition content protect (HDCP) key selection vector (KSV) of the device 12, or a media access control (MAC) address, or a digital transmission content protect (DTCP) certificate, one or more of which may be hashed with the serial number and/or model name of the device 12. This hashed result can be sent to the server. The server can now uniquely identify the device. In the event the device needs to be repaired and the unique ID contained in the device is changed, the device's previous identity advantageously can be migrated to a new hashed ID. To simplify this migration of the ID, the server can generate a unique key, and send it to the repaired device after receiving the initial hashed ID and notification (e.g., from the device 12) that the device was repaired and requires a new unique ID. In some implementations the user of the device 12 can manually recall the original ID, send it to the server, and the server, using the original ID, migrates records of the licenses previously enabled by the device 12 to the new ID.

The request may be made at set-up time. Alternatively, the request may be cached for later upload when, e.g., an appropriate broadband connection is sensed. In any case, the request may be sent to an Internet server at a prestored Internet address or to a cable head end or to another appropriate licensing entity or agent.

Block 70 indicates that assuming it passes authentication the TV 12 receives back the license in the form of licensing information, typically a code that must be input to the TV processor 18 to enable or unlock the associated component. Or the associated component may require software code to function and a critical piece of the code which is related to the licensable feature may be omitted when the device is vended, with this critical piece of code being supplied at block 70 to enable the licensable feature of the component. Prior to provision of the critical piece of code, the licensable feature of the component in effect is not merely locked out, but rather is effectively missing altogether, even though other parts of software code needed to execute the licensable feature are vended with the device.

The code may be automatically input to the appropriate internal components of the TV at block 72 or the code may be displayed on the TV and the user prompted by means of an onscreen UI to enter the code using, e.g., the RC 30. Proper input of the code activates the related component within the TV. Block 74 simply indicates that license fee data is maintained and used to generate billing information from the licensing agency to the manufacturer of the TV, and may also be used to generate marketing data as discussed further below. The data may be kept in the TV until uploaded to a licensing entity/agent by means noted above.

Figure 4:
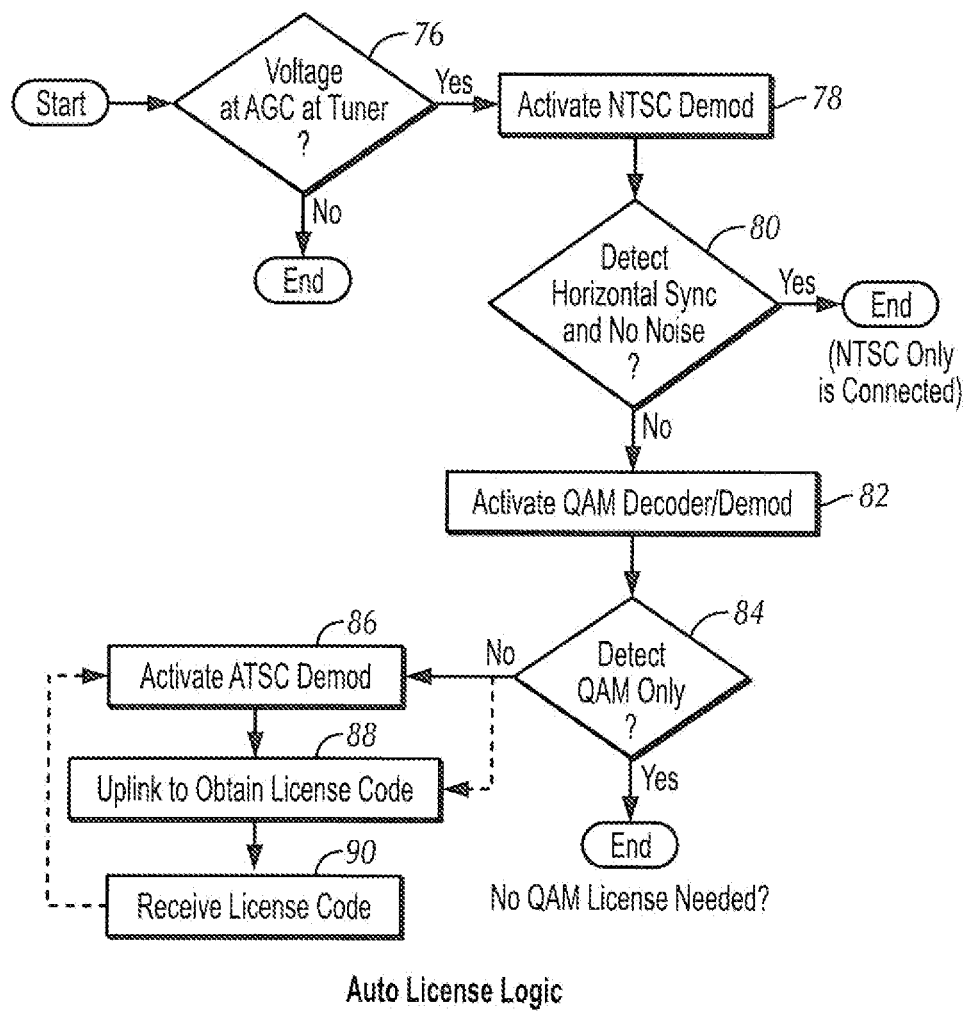
FIG. 4 is a flow chart of non-limiting logic for automatically detecting whether an ATSC demodulator is required to be activated.

FIG. 4 shows that automatic license determinations may be made outside of a user set-up routine if desired. In the example shown in FIG. 4, commencing at decision diamond 76 it is determined whether a predetermined physical condition exists in the TV, e.g., a particular kind of connection, from which it may be inferred what licensable components will be required. In the example of FIG. 4, the physical condition is the presence of a voltage in the automatic gain control (AGC) circuitry of the tuner 16, which would occur when, for instance, a connection is made at the TV chassis to the terrestrial antenna 34 or when a cable from the wall is connected to the F-type connector 38.

When the tested-for physical condition exists, the logic flows to block 78, in this example to activate the NTSC demodulator 54. This is done recognizing that NTSC demodulators typically require no licenses, so to avoid unnecessarily requesting licenses, the signal at the tuner 16 is first tested to determine if it is an NTSC signal. Decision diamond 80 indicates that the test may be whether "noise", is present in the signal.

If the test indicates that NTSC signals only are present the logic ends, but otherwise the logic flows to block 82 to activate the QAM decoder/demodulator 56. If QAM only is detected (by the QAM decoder/demodulator 56 recognizing QAM signals and/or no noise) the logic ends, but if the QAM decoder/demodulator 56 does not recognize the signal, this indicates that the signal is neither QAM nor (from decision diamond 80) NTSC, with the inference thus being that the signal is ATSC requiring use of the ATSC decoder/demodulator 58, which is activated at block 86 to process the signal. At block 88 an uplink is obtained by the TV processor 18 to the above-described licensing entity/agent to obtain the license code discussed above using the unique ID of the TV, and at block 90 the code is received and used as necessary to permit use of the ATSC decoder/demodulator 58.

Or, the step at block 90 can be omitted and the ATSC decoder/demodulator 58 immediately activated on the assumption that the processor 18 is programmed to send a message to the licensing entity/agent that licensing accounting is to be generated after activation of the ATSC decoder/demodulator 58.

Yet again, as shown in dashed lines in FIG. 4 the logic may flow first from decision diamond 84 to blocks 88 and 90 to obtain the licensing "unlock" code and then back to block 86 to activate the ATSC decoder/demodulator 58 using the code, to ensure that no use may be made of the ATSC decoder/demodulator 58 until such time as the licensing entity/agent has been informed of its use, has authenticated the TV for the necessary ATSC license, and has determined that under business rules the license code should be downloaded to fulfill the request.

Additional example inference rules that may be employed pursuant to automatically obtaining needed component licenses after vending the TV to avoid paying for unnecessary licenses prior to sale of the TV include, if there is ATSC present, it is less likely that QAM will be found; if ATSC is present, the total number of ATSC channels will be much smaller than the number for QAM channels. Also, when signals are received from an external modem 48, audio video programming does not require use of the built-in browser 26 and so receipt of video over an Ethernet link without receipt of signals at the internal modem 24 may be inferred to mean that the browser 26 is not in use.

Figure 5:
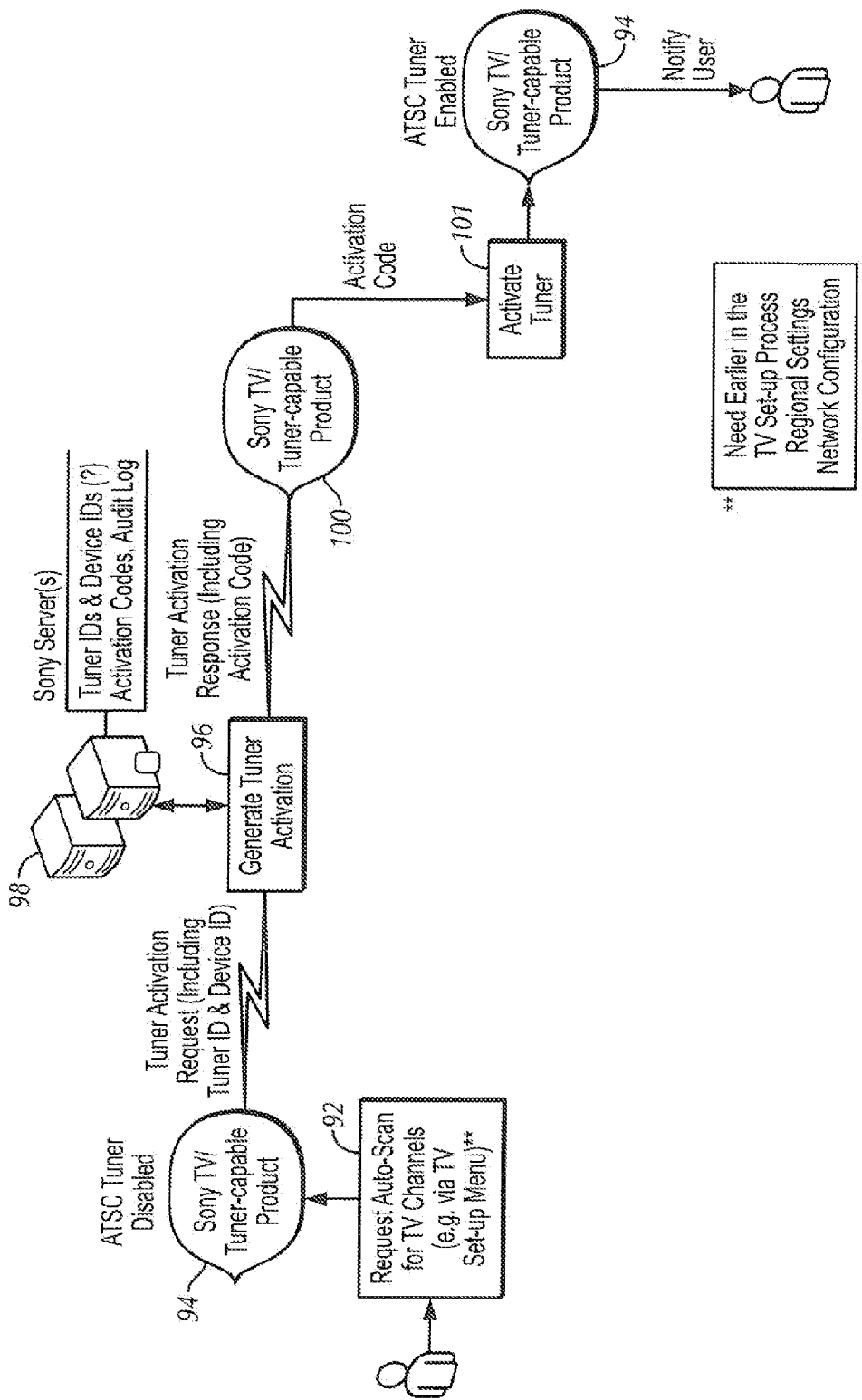
FIGS. 5-7 are schematic diagrams illustrating alternate methods for activating an ATSC demodulator.
Figure 6:
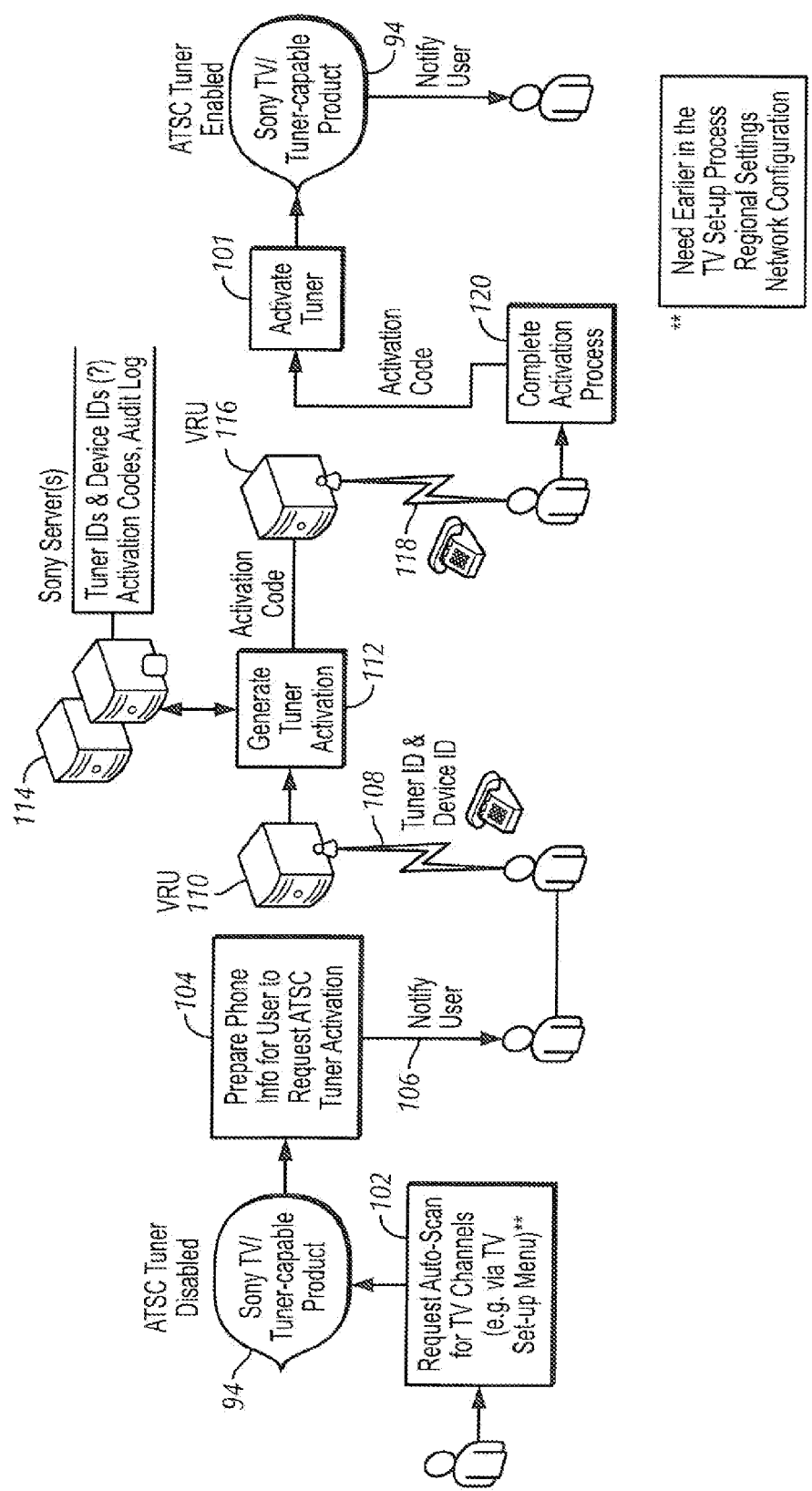
Figure 7:
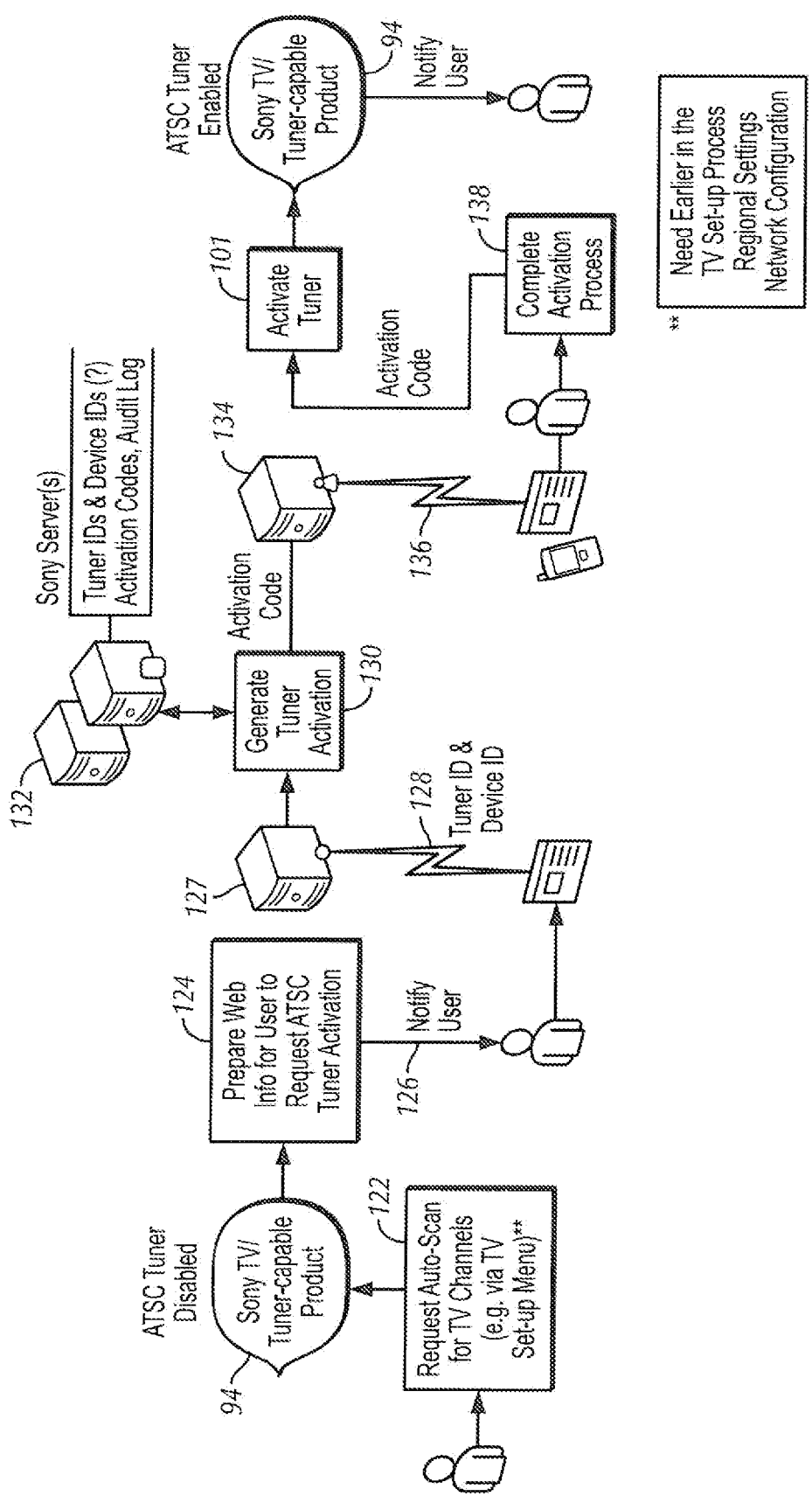

FIGS. 5-7 illustrate logic that may be used during setup to obtain licenses. Using, e.g., the RC 30, a person may input 92 a request to conduct auto-scan of available terrestrial or cable or satellite channels from, e.g., an onscreen setup menu presented on an audio video display product 94 (which may be implemented by the TV 12). In response, the AV display product sends an activation request for, e.g., the ATSC decoder/demodulator 58 which may include the tuner ID and product 94 ID and/or the decoder/demodulator 58 ID/product 94 ID. Activation of the ATSC decoder/demodulator 58 is executed at 96 using activation codes from one or more licensing entities/agents such as server 98, provided the licensing entities/agents determine, based on the information received from the product 94, that the product is entitled to a license for the requested component.

A log may be kept by the licensing entities/agents indicating what products and what components in those products have been activated and based on that log, licensing accounting data may be generated for purposes of presenting licensing invoices for activated components to the manufacturer of the product 94. In any case, 100 indicates that the product 94 receives the activation response, e.g., activation codes, to activate the demodulator/decoder 58 at 101, which converts the product 94 to an ATSC-capable device. The user may be notified using onscreen notification that ATSC programming may now be viewed using the product 94.

FIG. 6 shows an alternative embodiment. Using, e.g., the RC 30, a person may input 102 a request to conduct auto-scan of available terrestrial or cable or satellite channels from, e.g., an onscreen setup menu presented on an audio video display product 94 (which may be implemented by the TV 12). In response, at 104 telephone information including a phone number to a licensing entity/agent is prepared and the user notified 106 of the information by means of, e.g., a user interface or prompt presented on the product 94. The user enters 108 the information into a telephone, either by speaking the number or by holding the telephone adjacent a speaker on the product 94 for receiving dual tone multifrequency (DTMF) tones from the product that are detected by the telephone and used to automatically dial the number using, e.g., a voice response unit (VRU) 110.

Other alternate embodiments involve sending short message service (SMS) messages to a server to send the above information or scanning bar-type codes on the TV or component to send the requisite information to the server to obtain the license. In any case, determining what licenses are needed may be accomplished upon start up and/or periodically during operation.

Tuner activation is generated at 112 by licensing entities/agents 114 such as Internet servers and the activation code discussed above sent 116 to the VRU 110, which presents the code to the user to complete the activation process at 120. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

FIG. 7 shows another alternative embodiment. Using, e.g., the RC 30, a person may input 122 a request to conduct auto-scan of available terrestrial or cable or satellite channels from, e.g., an onscreen setup menu presented on an audio video display product 94 (which may be implemented by the TV 12). In response, at 124 Internet information including an Internet address of a licensing entity/agent is prepared and the user notified 126 of the information by means of, e.g., a user interface or prompt presented on the product 94. The user enters 128 the information into, e.g., a home computer 127. Tuner activation is generated at 130 by licensing entities/agents 132 such as Internet servers and the activation code discussed above sent 134 to the computer, which presents 136 the code to the user by means of, e.g., a web page or telephone to complete the activation process at 138. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

Alternatively, licensing information may be exchanged using short message service (SMS) codes or by using bar codes. To use bar codes the TV can include a camera that images the bar codes on various components, which are interpreted by the processor 18 as identifying information.

In some instances, if only a limited number (e.g., two) NTSC channels are needed, a limited and less expensive license may be requested and granted to permit access to only those two channels through the NTSC demodulator with a license being requested and granted to any component such as a stereo audio decoder should the legacy device (typically, a VCR) use such audio.

Figure 8:
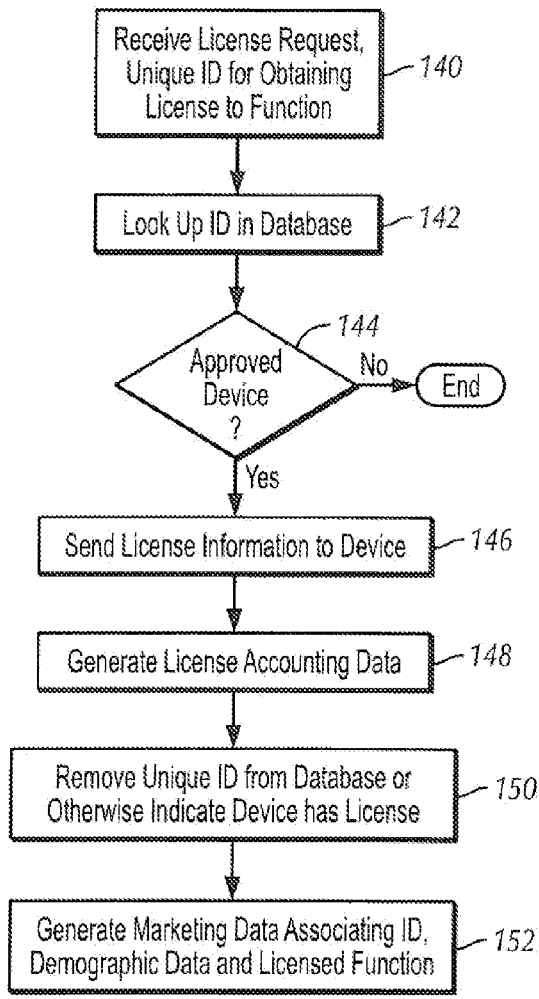
FIG. 8 is a flow chart of non-limiting logic for licensing a component in a TV.

FIG. 8 shows logic that may be executed by a licensing entity/agent computer. Commencing at block 140, a license request from, e.g., the TV 12 is received at, e.g., any of the above-described servers or head ends, which are programmed with software to execute the logic shown in FIG. 8. The unique ID discussed above is looked up at block 142 and the requesting device is authenticated at decision diamond 144 by, e.g., determining if the device is on a list of approved devices. If desired, it may be further determined whether a license for the particular licensable component that is the subject of the request has already been granted and if so, authentication fails. If the requesting device is approved and a license for the licensable component that is the subject of the request has not already been granted, the logic moves to block 146 to send license information, e.g., activation codes, to the requesting device.

Block 148 indicates that license accounting data is generated pursuant to sending the activation code to the requesting device. This accounting data can be used to effect remuneration from the manufacturer of the requesting device to the licensing authority for the component that is the subject of the request. At block 150 the authorized device database is modified to record the grant of the license.

Marketing data may be generated at block 152 based on the license grant. As an example, the total number of devices vended with the licensable component may be compared against the number of licenses granted to requesting devices to ascertain usage of the component compared to other components within the requesting device. For instance, it might be noted that 30% of vended devices of a particular TV model ever request activation of the ATSC tuner. This data can moreover be correlated to demographic data obtained during device registration so that, as an example, of the 30% of devices requesting activation of the TV tuner, it can be known which geographic region was more likely to request such activation, or which demographic age group, etc. It may be further ascertained, using device registration information submitted by purchasers, that of the devices requesting activation of the ATSC tuner, for example, 90% of those devices were second or third home TVs that consequently can be inferred to lack a cable or satellite hookup.

It is preferred that once a licensable component has been activated by obtaining a license for it, it cannot subsequently be deactivated by the user, to avoid multiple license payments for the same component. Accordingly, the TV processor 18 may be programmed to refuse deactivation commands from the user if any are input for any component that has been activated and licensed, at least insofar as deactivation would require another license to reactivate.

Verification of license may also be provided by the TV processor so that, for example, if a component license is requested by the TV but the corresponding feature never used within some period of time, the TV can retract the license request and any license fees refunded as a result.

Figure 9:
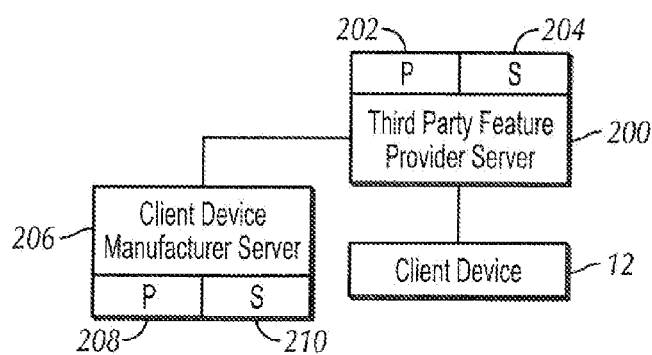
FIG. 9 is a block diagram showing a client device communicating with a server associated with a manufacturer of the client device and with a third party server that provides licensable features to the client device.

FIG. 9 shows that the client device 12 may receive licensable components such as licensable widgets or other licensable software from a third party server 200 having a processor 202 accessing a computer readable storage medium 204 such as disk-based or solid state storage for executing relevant portions of the logic below. By "third party" is meant a server affiliated with an entity other than the manufacturer of the client 12. The manufacturer of the client device 12, on the other hand, is instead affiliated with a manufacturer server 206 having a processor 208 executing a computer readable storage medium 210 such as disk-based or solid state storage for executing relevant portions of the logic below.

Figure 10:
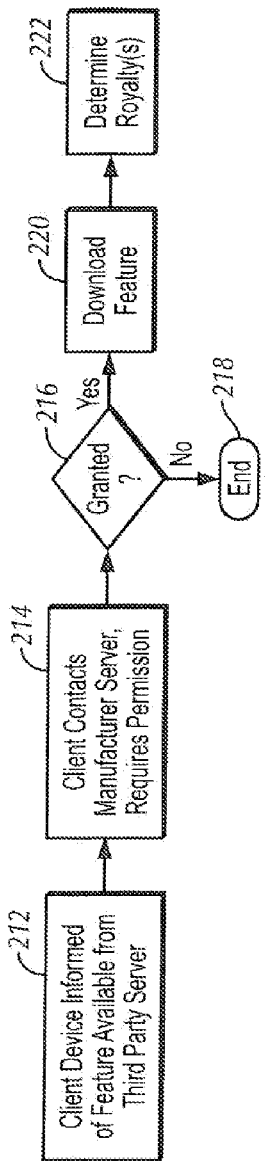
FIGS. 10-13 are flow charts of example logic used to coordinate licensable feature activation and royalty determinations between the manufacturer of the client device and a third party supplying the licensable feature to the client device.

Specifically, in one example and as shown in FIG. 10, at block 212 the client device 12 may be informed that a licensable component such as downloadable software is available for download over the Internet or other network from the third party server (TPS) 200 by, e.g., an Internet advertisement providing a hyperlink to the TPS 200 or other means. Proceeding to block 214, the client device 212, which can be programmed to intercept a hyperlink click to one or more TPS 200 or otherwise delay access of the link by a browser executed by the client device 12 pending grant of permission, can request (over the Internet, for example) permission from the client device manufacturer server (CDMS) 206 permission to download the licensable feature from the TPS 200. The CDMS 206 responds and at decision diamond 216 the client device 12 determines whether permission was granted. Responsive to a determination that permission was not granted, e.g., by receiving an affirmative "not granted" reply from the CDMS 206 or after a timeout period, the client device 12 ends the access attempt at state 218, and does not download the licensable feature.

In contrast, responsive to a determination at decision diamond 216 that permission was granted, e.g., by receiving an affirmative "granted" reply from the CDMS 206 or after a timeout period (in which case it is inferred that permission is granted through the absence of negation), the client device downloads from the TPS 200 the licensable feature at block 220. The servers 200, 206, responsive in some embodiments to a report from the client device 12 that the licensable feature has been downloaded and activated, coordinate at block 222 to determine royalty payments, e.g., to allocate payment of royalties to an author of the licensable feature, or to initiate payment of certain royalties from the client device 12 manufacturer to the third party affiliated with the TPS 200, or vice-versa. Other business use cases can be used.

Figure 11:
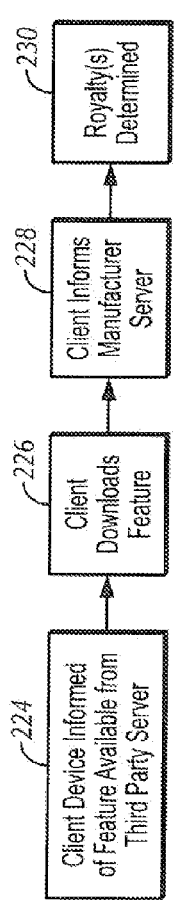

FIG. 11 shows a different mechanism that may be used by the devices in FIG. 9. Commencing at block 224 the client device 12 may be informed that a licensable component such as downloadable software is available for download over the Internet or other network from the TPS 200 by, e.g., an Internet advertisement providing a hyperlink to the TPS 200 or other means. Proceeding to block 226 the client device 12 downloads the licensable component from the TPS 200 by, e.g., selecting a hyperlink to the component and executing ensuing instructions. Then, at block 228 the client device 12 informs the CDMS 206 that the client device 12 has obtained the component and has enabled the component or, in some embodiments, requests permission to enable the component, in which case logic outlines above at decision diamond 216 may be executed to determine whether the client device is authorized to enable the component or not.

Assuming that the client device 12 informs the CDMS 206 that it has received and enabled the licensable component, at block 230 royalty payments therefor are determined by one or both of the servers 200, 206.

Figure 12:
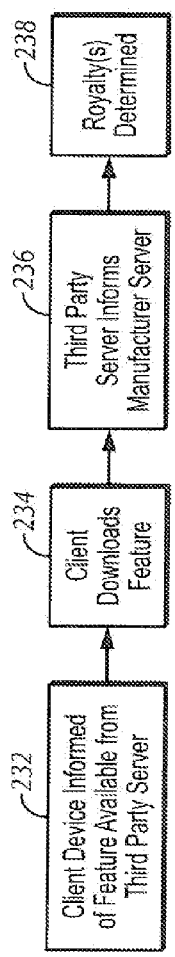

FIG. 12 shows yet another mechanism that may be used by the devices in FIG. 9. Commencing at block 232 the client device 12 may be informed that a licensable component such as downloadable software is available for download over the Internet or other network from the TPS 200 by, e.g., an Internet advertisement providing a hyperlink to the TPS 200 or other means. Proceeding to block 234 the client device 12 downloads the licensable component from the TPS 200 by, e.g., selecting a hyperlink to the component and executing ensuing instructions. Then, at block 236 the TPS 200 informs the CDMS that the client device has obtained the component. At block 238 royalty payments therefor are determined by one or both of the servers 200, 206.

Figure 13:
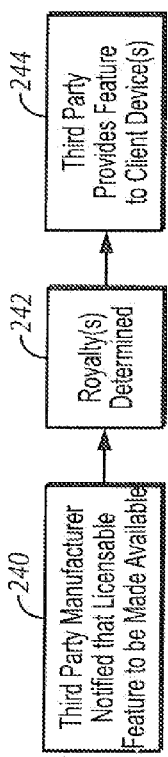

Concluding with FIG. 13, at block 240 prior to making available the licensable component to the client device 12, the TPS 200 and CDMS 206 may communicate to notify the CDMS 206 that the TPS 200 will host the licensable component for download by devices 12 made by the manufacturer affiliated with the CDMS 206. Royalties are then determined at block 242. For example, for simplicity it may be determined that a single blanket royalty will be paid and responsive thereto a predetermined maximum number of licensable components may be provided by the TMDS 200 to client devices 12 affiliated with the manufacturer, and no more. Or, individual royalty payments for each individual provision of the licensable component to a client device on a one-to-one basis may be established and allocated or paid or triggered according to download events in accordance with principles discussed above. At block 244 the TPS 200 makes the licensable component available to the client device 12.

Without limitation, the need for paying for licenses for the following technologies may be determined during TV set-up or subsequently by automatically detecting whether the technologies are being used:

Video Decoders

MPEG-2 video, MPEG-2 video with optical disk, MPEG4 advanced video coding (AVC), MPEG4 Visual, MPEG video codec (VC) 1

Audio Decoders unified AAC (MPEG 2&4 AAC) 2ch, unified AAC (MPEG 2&4 AAC) 3ch, Dolby Digital AC3 2ch, Dolby Digital AC3 5.1ch, Dolby Digital Plus (DD+) 2ch, ProLogic2 (Surround Sound), MPEG audio 1&2 layer 1, 2, 3) MP3, DTS_Blueray disk (BD) (2CH/2CH+ Digital Out), BBE Sound, sound retrieval system (SRS) sound EPGs Gemstar Guide EPG, non-Gemstar EPG (SI-EPG)

Demodulators

Association of Radio Industries and Businesses (ARIB) (D+BS+CS), ATSC, digital video broadcasting (terrestrial) (DVB-T)

Other Components Including Digital Rights Management (DRM)

Joint Photographic Expert Group (JPEG), digital transmission content protection (DTCP)/AACP/Open MG, HDMI, System Synchronized Brightness Control (contrast enhancement), Inverter controller integrated circuit (IC), IEEE 802.11 wireless license, IEEE 802.11(n), BD Pool (player), BD Pool (recorder), digital video disk (DVD) format, IEEE 802.11/16, IEEE 1394

Software

JAVA, MHP/Ginga interactive TV software, JAVA-BD combination, DivX codec software, Windows Media Audio, Windows Media Video, Windows Media Network read, Windows Media digital rights management (DRM), audio watermark, Netfront, web browser software.

Additionally, production encryption keys and test encryption keys may be used to permit testing a licensable component in production, pre-sale, without triggering the above-described license request mechanisms. A TV may be placed in a test activation mode used only in the manufacturing or test phase, and if desired the test mode may have a hardwired time out. A test key or keys can be used to activate licensable components and the license request algorithm recognizes a test key and responsive to the recognition does not request a license. The test activation mode may be hardwired to deactivate after a single power cycle and the TV processor may not permit reactivation of the test mode thereafter. Activation of a licensable component thereafter requires a production key which is associated with a license request.

While the particular ACTIVATING LICENSABLE COMPONENT PROVIDED BY THIRD PARTY TO AUDIO VIDEO DEVICE is herein shown and described in detail, it is to be understood that the subject matter which is encompassed by the present invention is limited only by the claims.

What is claimed is:

1. Client device comprising:
    processor;
    input device configured for communicating with the processor to indicate selection of a link to a third party server (TPS) providing a licensable component;
    computer readable storage medium bearing instructions executable by the processor to:
    responsive to the selection and prior to accessing the link pursuant to selection of the link, request permission from a client device manufacturer server (CDMS) affiliated with a manufacturer of the client device permission to download the licensable component from the TPS;
    responsive to a determination that permission to download the licensable component from the TPS is not granted, not download the licensable component; and
    responsive to a determination that permission to download the licensable component from the TPS is granted, download from the TPS the licensable component, wherein the client device receives licensing information and/or a critical piece of the code that must be input to the client device to enable or unlock the licensable component, wherein the licensable component cannot execute a licensable feature associated with the licensable component prior to provision of the critical piece of code, the licensable feature is not merely locked out, but rather is effectively missing altogether, even though other parts of software code needed to execute the licensable feature are vended with the client device, wherein the licensing information and/or the critical piece of code is automatically input to appropriate internal components of the client device or displayed on the client device with a prompt to enter the licensing information and/or critical piece of code; and
    wherein license fee data is maintained for use in generating billing information, wherein the license fee data is stored in the client device until uploaded to a licensing entity or agent.

2. The client device of claim 1, wherein the client device receives information that the licensable component is available for download over a network from the TPS.

3. The client device of claim 1, wherein the client device delays access of the link by a browser executed by the processor pending grant of permission.

4. The client device of claim 1, wherein the client device determines that permission is not granted to download the licensable component based on receiving an affirmative "not granted" reply from the CDMS.

5. The client device of claim 1, wherein the client device determines that permission is not granted to download the licensable component based on not receiving any reply from the CDMS before a timeout period expires.

6. The client device of claim 1, wherein the client device determines that permission is granted to download the licensable component based on receiving an affirmative "granted" reply from the CDMS.

7. The client device of claim 1, wherein the client device determines that permission is granted to download the licensable component based on not receiving any reply from the CDMS before a timeout period expires.

8. Client device comprising:
    processor;
    input device configured for communicating with the processor to indicate selection of a link to a third party server (TPS) providing a licensable component;
    computer readable storage medium bearing instructions executable by the processor to:
    obtain the licensable component from the TPS; and
    responsive to obtaining the licensable component from the TPS, inform a client device manufacturer server (CDMS) affiliated with a manufacturer of the client device that the licensable component has been obtained from the TPS to facilitate accounting for royalties for the licensable component wherein the client device receives licensing information and/or a critical piece of the code that must be input to the client device to enable or unlock the licensable component, wherein the licensable component cannot execute a licensable feature associated with the licensable component prior to provision of the critical piece of code, the licensable feature is not merely locked out, but rather is effectively missing altogether, even though other parts of software code needed to execute the licensable feature are vended with the client device, wherein the licensing information and/or the critical piece of code is automatically input to appropriate internal components of the client device or displayed on the client device with a prompt to enter the licensing information and/or critical piece of code; and
    wherein license fee data is maintained for use in generating billing information, wherein the license fee data is stored in the client device until uploaded to a licensing entity or agent.

9. The client device of claim 8, wherein the client device receives information that the licensable component is available for download over a network from the TPS.

10. The client device of claim 8, wherein the client device informs the CDMS that the client device has obtained the licensable component and has enabled the licensable component.

11. The client device of claim 8, wherein the client device informs the CDMS that the client device has obtained the licensable component and requests permission from the CDMS to enable the licensable component.

12. The client device of claim 11, wherein the client device determines that permission is not granted to enable the licensable component based on receiving an affirmative "not granted" reply from the CDMS and responsive thereto does not enable the licensable component.

13. The client device of claim 11, wherein the client device determines that permission is not granted to enable the licensable component based on not receiving any reply from the CDMS before a timeout period expires and responsive thereto does not enable the licensable component.

14. The client device of claim 11, wherein the client device determines that permission is granted to enable the licensable component based on receiving an affirmative "granted" reply from the CDMS and responsive thereto enables the licensable component.

15. The client device of claim 11, wherein the client device determines that permission is granted to enable the licensable component based on not receiving any reply from the CDMS before a timeout period expires and responsive thereto enables the licensable component.

16. A third party server (TPS) not affiliated with a manufacturer of a client device, the manufacturer of the client device being associated with a client device manufacturer server (CDMS), comprising:
  processor;
  computer readable storage medium bearing instructions executable by the processor to:
  download to the client device a licensable feature established by a licensable component; and
  communicate with the CDMS to inform the CDMS that the client device has obtained the licensable component such that royalty accounting therefor is facilitated wherein the licensable component is established at least in part by licensing information that must be input to the client device to enable or unlock a licensable feature, and/or a critical piece of the code without which the licensable feature cannot be executed by the client device such that prior to provision of the critical piece of code, the licensable feature is not merely locked out, but rather is effectively missing altogether, even though other parts of software code needed to execute the licensable feature are vended with the client device, wherein the licensing information and/or the critical piece of code is automatically input to appropriate internal components of the client device or displayed on the client device with a prompt to enter the licensing information and/or critical piece of code; and
  wherein license fee data is maintained for use in generating billing information, wherein the license fee data is stored in the client device until uploaded to a licensing entity or agent.

17. The TPS of claim 16, wherein the TPS downloads the licensable component to the client device responsive to receiving a selection from the client device of a hyperlink provided by the TPS.

18. The TPS of claim 16, wherein the TPS executes royalty accounting associated with downloading the licensable component to the client device.

19. The TPS of claim 16, wherein the TPS does not execute royalty accounting associated with downloading the licensable component to the client device.

* * * * *

UNITED STATES PATENT AND TRADEMARK OFFICE
CERTIFICATE OF CORRECTION

PATENT NO. : 8,544,111 B2  
APPLICATION NO. : 13/034179  
DATED : September 24, 2013  
INVENTOR(S) : Peter Shintani and Ludovic Etienne Douitlet Page 1 of 1

It is certified that error appears in the above-identified patent and that said Letters Patent is hereby corrected as shown below:

On the Title Page, Item (63) should read:

U.S. Related Application Data:
-- Continuation in part of U.S. Serial No. 12/970,215 filed December 16, 2010. --

Signed and Sealed this
Sixth Day of May, 2014

Michelle K. Lee
*Deputy Director of the United States Patent and Trademark Office*